[19] US009860457B2

(12) United States Patent
Ota

(10) Patent No.: US 9,860,457 B2
(45) Date of Patent: Jan. 2, 2018

(54) IMAGE CAPTURING APPARATUS AND CONTROL METHOD OF THE SAME

(71) Applicant: CANON KABUSHIKI KAISHA, Tokyo (JP)

(72) Inventor: Tomohiro Ota, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/227,983

(22) Filed: Aug. 4, 2016

(65) Prior Publication Data
US 2017/0064217 A1 Mar. 2, 2017

(30) Foreign Application Priority Data

Aug. 26, 2015 (JP) ................................. 2015-167006

(51) Int. Cl.
*H04N 5/232* (2006.01)
*H04N 5/77* (2006.01)
*H04N 5/262* (2006.01)

(52) U.S. Cl.
CPC ....... *H04N 5/2628* (2013.01); *H04N 5/23216* (2013.01); *H04N 5/23287* (2013.01); *H04N 5/23293* (2013.01); *H04N 5/77* (2013.01)

(58) Field of Classification Search
CPC ............. H04N 5/2628; H04N 5/23216; H04N 5/23287; H04N 5/77; H04N 5/23293
See application file for complete search history.

(56) References Cited

U.S. PATENT DOCUMENTS

| 7,443,404 B2 | 10/2008 | Kawamoto et al. |
| 8,013,925 B2* | 9/2011 | Ito ..................... G11B 27/3027 348/333.05 |
| 8,098,954 B2 | 1/2012 | Hara |
| 2007/0263013 A1 | 11/2007 | Kawamoto et al. |
| 2015/0007072 A1* | 1/2015 | Yoshikawa ........... G06F 1/1626 715/765 |
| 2015/0015613 A1* | 1/2015 | Iwaki ....................... G06T 3/00 345/643 |
| 2016/0295120 A1* | 10/2016 | Ota ..................... H04N 5/23293 |

FOREIGN PATENT DOCUMENTS

| JP | 2005-124004 A | 5/2005 |
| JP | 4781229 B2 | 7/2011 |
| JP | 2011-229172 A | 11/2011 |

* cited by examiner

Primary Examiner — Hung Lam
(74) Attorney, Agent, or Firm — Fitzpatrick, Cella, Harper & Scinto

(57) ABSTRACT

An image capturing apparatus comprises an image capturing unit configured to capture an object, a display unit configured to display a video image captured by the capturing unit, an extracting unit configured to extract an area of the video image that is within a display range displayed by the display unit and is smaller than the display range, a detecting unit configured to detect a change in a position or attitude of the apparatus, and a display control unit configured to perform control so that an area of the video image that is within the display range displayed by the display unit and is not extracted by the extracting unit is larger on a side in a direction in which the position or attitude of the apparatus changes.

15 Claims, 6 Drawing Sheets

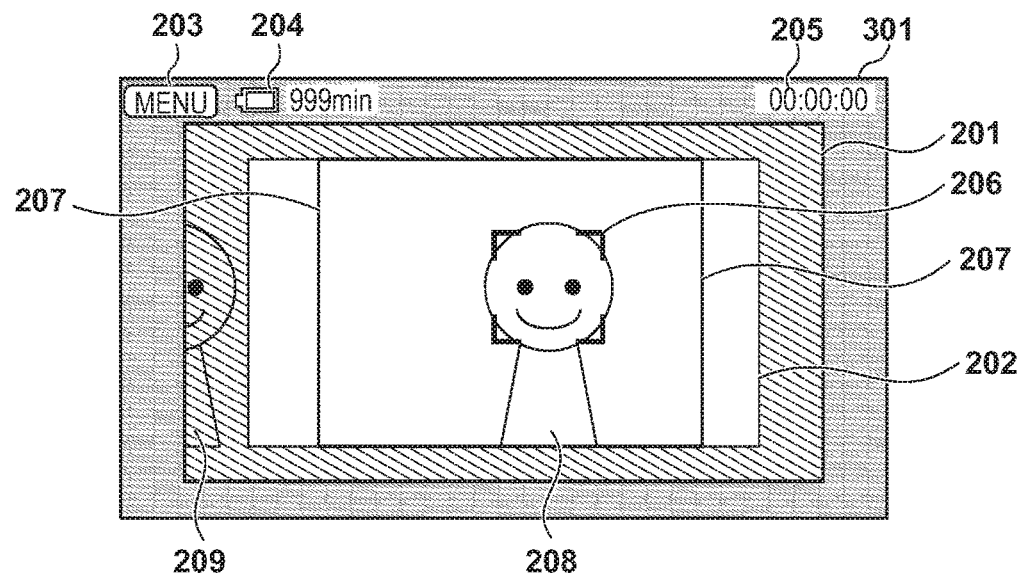
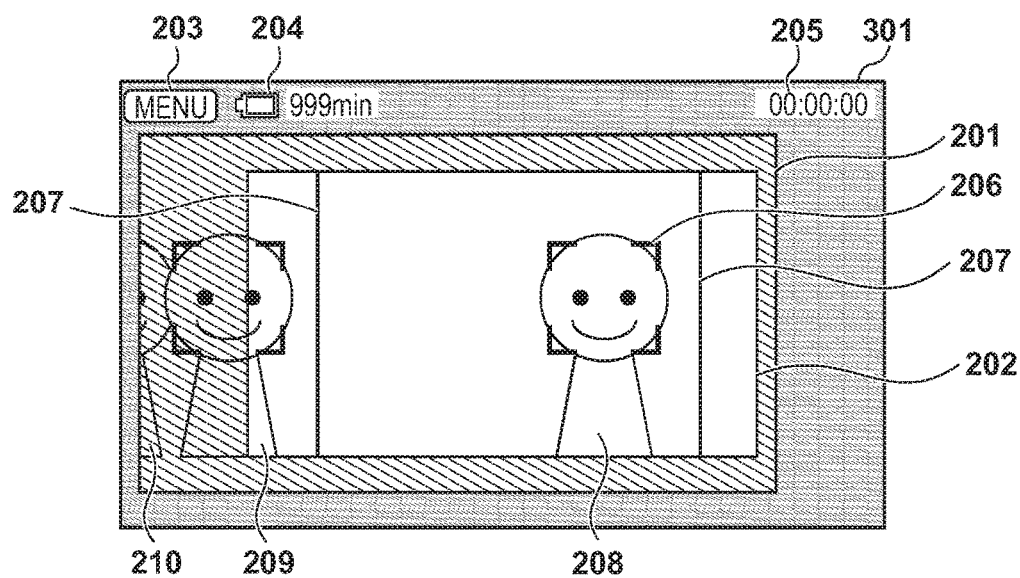

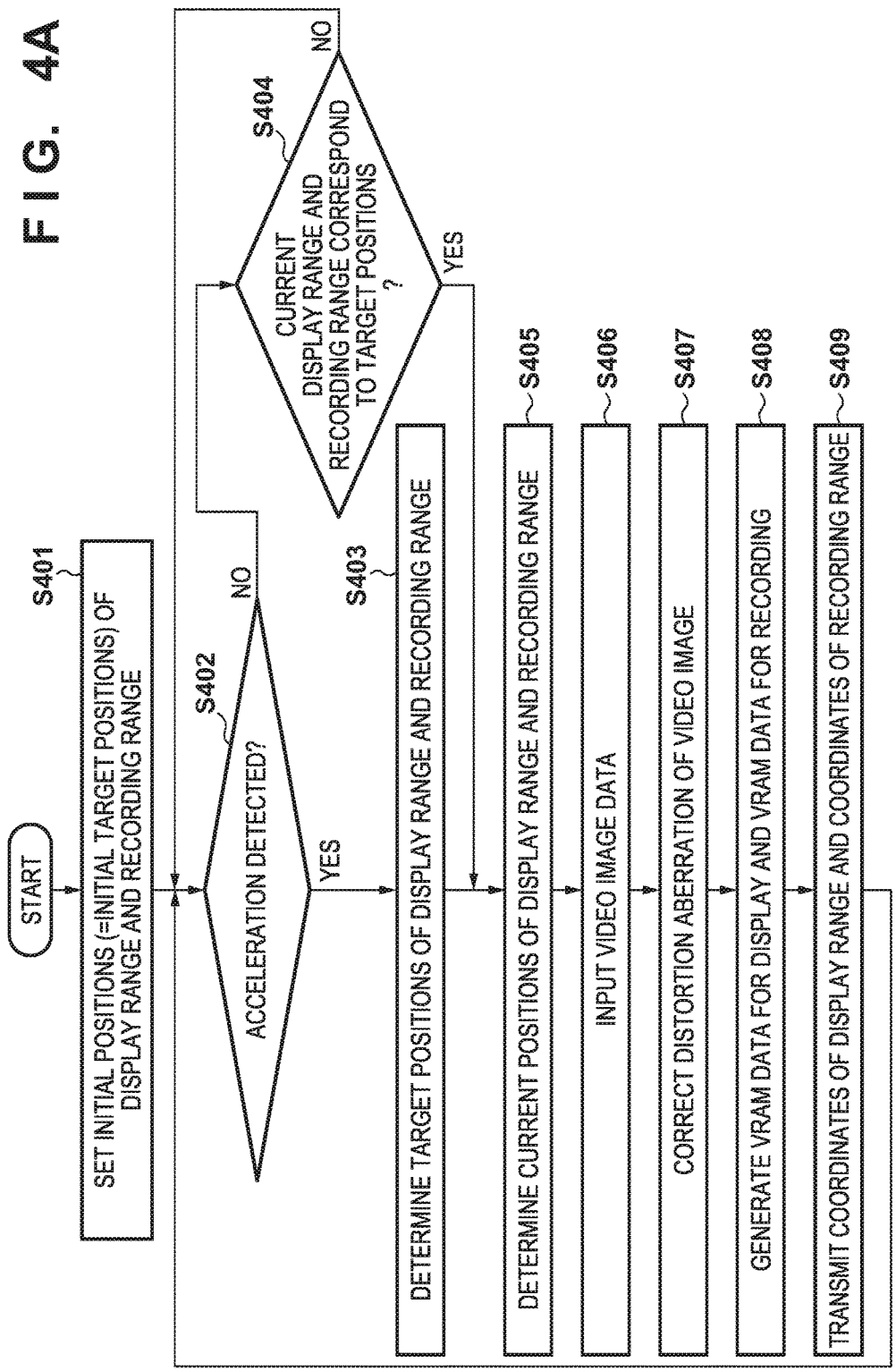

IMAGE CAPTURING APPARATUS AND CONTROL METHOD OF THE SAME

BACKGROUND OF THE INVENTION

Field of the Invention

The present invention relates to a video image recording technique for extracting a part of a displayed video image and recording the resultant video image.

Description of the Related Art

Conventionally, a technique for extracting (cropping) a part of a captured video image and recording the resultant video image is known. In this technique, the entire captured video image is displayed on a display unit by an electronic view finder (EVF) or the like. That is, a part of the displayed video image serves as a range to be recorded (recording range). Accordingly, it is possible to recognize what object is present outside the recording range of the video image, based on the displayed video image.

With this measure, when performing framing such that, for example, an object that is not desired to be shown is located outside the recording range, a user can check whether or not the object that is not desired to be shown will show in the recording range, based on the displayed video image.

If the object that is not desired to be shown is located outside the recording range of the displayed video image, a user can recognize that he or she should not move the camera any more in the direction in which the object that is not desired to be shown is present. Also, when a user moves such a camera to perform shooting, it is preferable for him or her to immediately view the state of an object that may be present in the direction in which the camera is moved, and to be able to reliably recognize the timing to stop moving the camera.

Japanese Patent Laid-Open No. 2005-124004 discloses a technique in which shooting setting content is displayed in an excess area in which no video image is displayed, thereby preventing visibility reduction that is caused by the shooting setting content being displayed overlapping the video image. Furthermore, Japanese Patent Laid-Open No. 2011-229172 discloses a technique in which a range that is larger than a recording range of a video image is displayed, thereby facilitating a zoom operation.

Meanwhile, the size of a video image that is displayed has an effect on a reading operation of an image sensor and the size of a video memory (VRAM), and thus it is preferable to avoid an extremely large sized video image in view of data transfer and power consumption.

In Japanese Patent Laid-Open No. 2005-124004, it is not possible to view the outside of the recording range of the video image using the EVF. In Japanese Patent Laid-Open No. 2011-229172, although the outside of the recording range of the video image can be viewed on the EVF to some extent, when the camera is moved, panned, or tilted, a range in the direction opposite to the direction in which the camera is moved is also displayed to be larger, which requires an improvement in view of data transfer and power consumption.

SUMMARY OF THE INVENTION

The present invention has been made in consideration of the aforementioned problems, and realizes a technique for improving, when an apparatus is moved to perform shooting, visibility of the outside of a recording range of a video image, thereby making it possible to improve data transfer and power consumption.

In order to solve the aforementioned problems, the present invention provides an image capturing apparatus comprising: an image capturing unit configured to capture an object; a display unit configured to display a video image captured by the capturing unit; an extracting unit configured to extract an area of the video image that is within a display range displayed by the display unit and is smaller than the display range; a detecting unit configured to detect a change in a position or attitude of the apparatus; and a display control unit configured to perform control so that an area of the video image that is within the display range displayed by the display unit and is not extracted by the extracting unit is larger on a side in a direction in which the position or attitude of the apparatus changes.

In order to solve the aforementioned problems, the present invention provides a control method of an image capturing apparatus comprising: capturing an object image; displaying a captured video image; extracting an area of the video image that is within a display range for the displaying and is smaller than the display range; detecting a change in a position or attitude of the apparatus; and performing control so that an area of the video image that is within the display range and is not extracted is larger on a side in a direction in which the position or attitude of the apparatus changes.

In order to solve the aforementioned problems, the present invention provides a non-transitory computer-readable storage medium storing a program for causing a computer to execute a control method of an image capturing apparatus comprising: capturing an object image; displaying a captured video image; extracting an area of the video image that is within a display range for the displaying and is smaller than the display range; detecting a change in a position or attitude of the apparatus; and performing control so that an area of the video image that is within the display range and is not extracted is larger on a side in a direction in which the position or attitude of the apparatus changes.

According to the present invention, it is possible to improve, when an apparatus is moved to perform shooting, visibility of the outside of a recording range of a video image, thereby making it possible to improve data transfer and power consumption.

Further features of the present invention will become apparent from the following description of exemplary embodiments with reference to the attached drawings.

BRIEF DESCRIPTION OF THE DRAWINGS

FIGS. 3A and 3B are diagrams illustrating the video image that is displayed by display control processing 2.

FIGS. 4A to 4C are flowcharts illustrating display control processing to be subjected to a video image according to the embodiment.

DESCRIPTION OF THE EMBODIMENTS

The following will describe the details of an embodiment in which an image capturing apparatus according to the present invention is applied to a digital video camera (hereinafter, referred to as "camera") capable of shooting a moving image and a still image (hereinafter, referred to as "video image"), with reference to the accompanying drawings.

Configuration of Image Capturing Apparatus

A configuration of a camera 100 of the present embodiment will be described with reference to FIG. 1.

Figure 1:
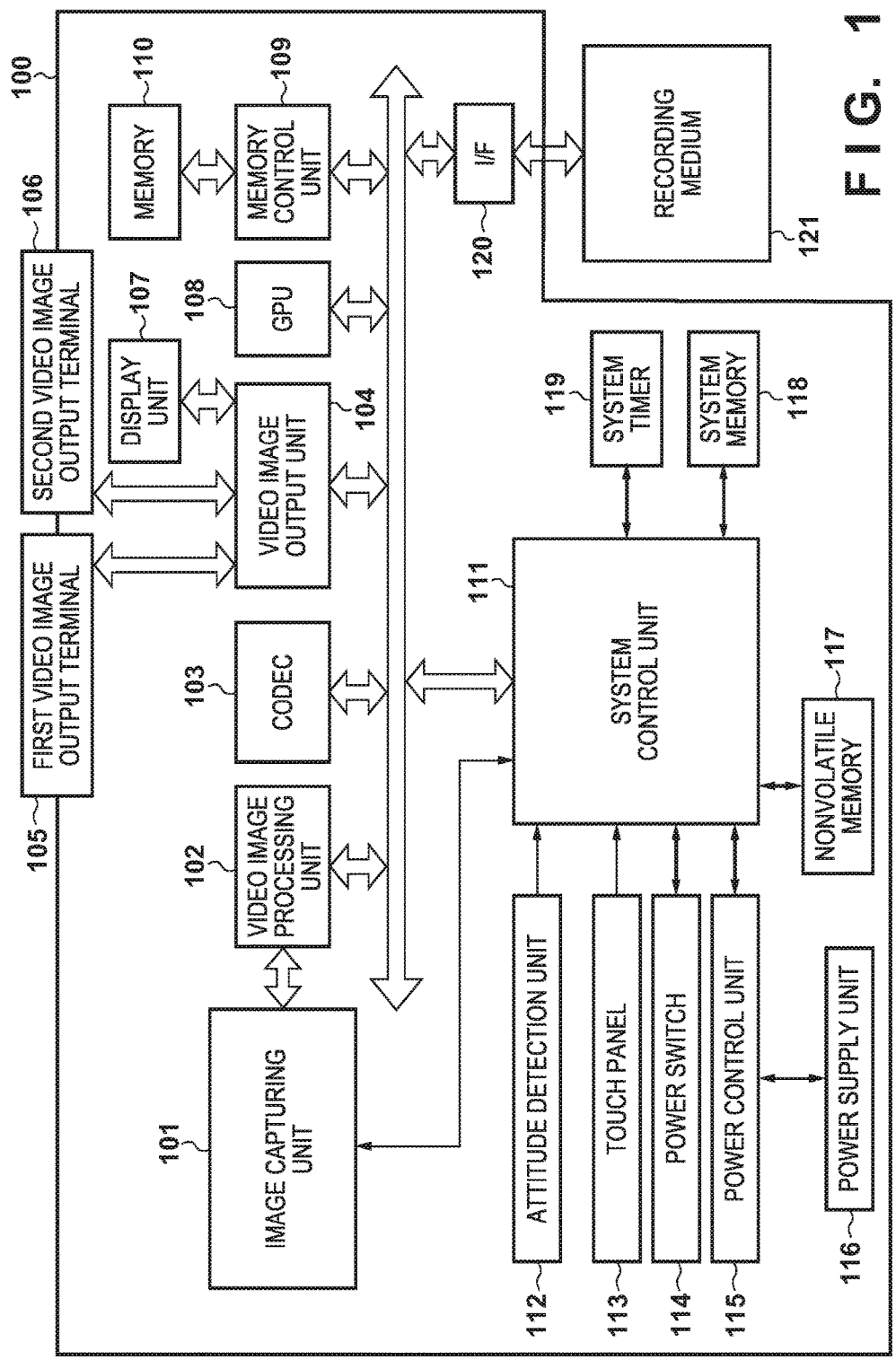
FIG. 1 is a block diagram illustrating a configuration of an apparatus of an embodiment according to the present invention.

In FIG. 1, an image capturing unit 101 includes: an optical lens including a focus lens, a zoom lens, a shake correction lens, and the like; a diaphragm; an image sensor such as a CCD or a CMOS for converting a formed optical image into electric signals; and an A/D converter for converting an analog signal into a digital signal. Note that the image sensor may include an anti-vibration control mechanism that physically shifts in the vertical direction and the horizontal direction.

A video image processing unit 102 performs resizing processing, such as predetermined pixel interpolation and reduction, and color conversion processing, with respect to data from the image capturing unit 101 or data from a memory control unit 109 to generate VRAM data, and writes the generated VRAM data to a memory 110 via the memory control unit 109. Further, the video image processing unit 102 performs predetermined calculation processing using video image data, and, based on an obtained result of the calculation, a system control unit 111 performs exposure control, focus detection control, and anti-vibration control. The predetermined calculation processing includes face detection processing for detecting the face or the like of an object. Thus, AF (Automatic Focus) processing, AE (Automatic Exposure) processing, and anti-vibration processing are performed. Furthermore, the video image processing unit 102 performs the predetermined calculation processing using captured video image data, and AWB (Automatic White Balance) processing is performed on the basis of the calculation results. Furthermore, the video image processing unit 102 performs processing for decoding encoded video image data using a codec 103, and generates new VRAM data by performing resizing processing or color conversion processing for the decoded data.

The codec 103 encodes the VRAM data generated by the video image processing unit 102 using a moving image compression method such as MPEG2 or H.264. Furthermore, the codec 103 decodes encoded video image data read from the memory control unit 109, and transmits the decoded VRAM data to the memory control unit 109.

A video image output unit 104 reads a plurality of pieces of VRAM data held in the memory 110 via the memory control unit 109, and generates video image signals for display by overlapping the read pieces of VRAM data with each other. The video image output unit 104 outputs, to a first video image output terminal 105, VRAM data for recording, which is obtained by a GPU 108 (described later) extracting a part of a video image. Furthermore, the video image output unit 104 outputs, to a second video image output terminal 106 and a display unit 107, a video image in which VRAM data for on-screen display (OSD) that is obtained by the GPU 108 and VRAM data for display that is generated by the video image processing unit 102 are overlapped.

The first video image output terminal 105 is, for example, a HDMI (registered trademark) terminal, an SDI terminal, or a composite video output terminal. Since the first video image output terminal 105 is configured mainly to connect the camera 100 to an external device (not shown) such as a recorder, VRAM data for display is not overlapped with VRAM data for OSD.

Similar to the first video image output terminal 105, the second video image output terminal 106 is, for example, a HDMI (registered trademark) terminal, an SDI terminal, or a composite video output terminal. Since the second video image output terminal 106 is configured to mainly connect the camera 100 to a digital television or an external monitor that serves as an external device, the VRAM data for display with which the VRAM data for OSD is overlapped is output therefrom.

The same video image signal is output to the display unit 107 as that output to the second video image output terminal 106 from the video image output unit 104. The display unit 107 is comprised of a display device such as a liquid crystal panel or an organic EL panel, and may be integrated in the camera 100 or may be an external device that is connected as a separate component to the camera 100. Furthermore, a plurality of display units 107 may be provided, or an electronic view finder (EVF) of a peeking type in which an eyepiece is attached to a display unit 107 may be provided.

The graphics processing unit (GPU) 108 renders characters and icons indicating the state or settings of the camera 100, and various types of frames and markers on the VRAM of the memory 110. Information such as characters and icons is stored in a nonvolatile memory 117 in a compressed bitmap format or a vector format. The system control unit 111 reads the information from the nonvolatile memory 117 and writes the read information to the memory 110, and the GPU 108 reads the information and performs rendering on the VRAM in the memory. Furthermore, the GPU 108 also has a mixer function of extracting/cutting off VRAM data, combining the plurality of pieces of VRAM data, and resizing the combined data into pieces of VRAM data having different resolutions. The mixer function includes a color conversion function of converting a color space of the rendered VRAM data into a color space desired by the video image output unit 104.

The memory control unit 109 has a function of arbitrating access requests to the memory 110 from each of the blocks.

The memory 110 stores pieces of VRAM data that are processed by the video image processing unit 102, the codec 103, the video image output unit 104, and the GPU 108. Furthermore, the memory 110 also has a function of temporarily storing encoded video image data output from the codec 103, or encoded video image data read from a recording medium 121. The memory 110 has a storage capacity that is sufficient for storing moving images and audio for a predetermined time period. Furthermore, the memory 110 serves also as a bitmap memory for OSD rendering, and a video memory for video image display.

The system control unit 111 includes a CPU or an MPU that performs overall control of the camera 100. By reading and executing programs stored in the nonvolatile memory 117, the system control unit 111 realizes the processing of the flowcharts that will be described later. The system control unit 111 may include a plurality of CPU cores. In this case, tasks described in the programs can be processed by the plurality of CPU cores together.

An attitude detection unit 112 converts a motion (low frequency) such as movement (slide), panning, or tilt, in which the position or attitude of the camera 100 changes, or a high frequency vibration caused by a shake of the camera 100 due to a hand shake or the like into an electric signal, and transmits the converted electric signal to the system control unit 111. The system control unit 111 detects, based on a detection value detected by the attitude detection unit 112, the direction and the speed in and at which the camera 100 is moved, panned, or tilted. Furthermore, the system control unit 111 detects a shake of the camera 100 based on a detection value detected by the attitude detection unit 112, and performs anti-vibration processing for shifting the shake correction lens or the image capturing unit 101 depending on the shake amount of the camera 100, or performs electronic anti-vibration processing for extracting the video image using the video image processing unit 102. The attitude detection unit 112 may be, for example, an acceleration sensor, a gyroscope, or the like. Note that the attitude detection unit 112 is not an essential component, and a configuration is also possible in which, for example, a motion vector of an object is detected based on a change in the video image that is obtained by the video image processing unit 102, and thereby a change in the attitude of the camera 100 or information regarding vibration thereof that will be obtained by the attitude detection unit 112 is estimated.

A touch panel 113 is a touch sensor capable of detecting a touch operation on the display unit 107. The touch panel 113 and the display unit 107 can be constructed as a single integrated unit. For example, the touch panel 113 is constructed in such a manner that the transmittance of light will not interfere with the display presented by the display unit 107, and it is attached to the uppermost layer of the display face of the display unit 107. In addition, input coordinates on the touch panel 113 and display coordinates on the display unit 107 are correlated. As a result, a GUI can be constructed that makes it possible for the user to directly manipulate the screen displayed on the display unit 107.

A power switch 114 transmits an operation signal for switching between power on and power off of the camera 100 to the system control unit 111.

A power control unit 115 is constituted by, for example, a battery detection circuit, a DC-DC converter, a switch circuit for changing over the block to be supplied with power, and detects a battery has been inserted or not, the type of the battery, and the residual capacity thereof. Further, the power control unit 115 controls the DC-DC converter in accordance with the detection results and an instruction of the system control unit 111, and supplies a necessary voltage for a necessary length of time to each of the units including the recording medium 121.

A power supply unit 116 comprises a primary battery such as an alkaline battery or a lithium battery, a secondary battery such as an NiCd battery, an NiMH battery, or an Li-ion battery, or an AC adaptor and the like.

A nonvolatile memory 117 is, for example, an EEPROM, which is electrically erasable and recordable. In the nonvolatile memory 117, constants and programs, for example, for operating the system control unit 111 are stored. In this context, "programs" may refer to programs for executing various flowcharts that will be described later.

A system memory 118 is, for example, a RAM and used also as a work memory where constants and variables for operating the system control unit 111, and the programs read out from the nonvolatile memory 117 are expanded. The system control unit 111 also performs display control by controlling the video image output unit 104, the GPU 108, and the memory control unit 109. The system memory 118 and the memory 110 may be in common use, and in this case, since access thereto is arbitrated by the memory control unit 109, an additional low-capacity memory capable of performing high-speed access may directly be connected to and mounted on the system control unit 111.

A system timer 119 is a timer circuit for measuring time periods for various types of controls and the time of an integrated clock.

The recording medium interface (I/F) 120 is for interfacing with the recording medium 121 such as the memory card or hard disk. An interface (I/F) 120 is for interfacing with the recording medium 121 such as a memory card or a hard disk. The interface 120 records encoded video image data held in the memory 110 to the recording medium 121 and reads encoded video image data and additional information that are recorded in the recording medium 121, and transfers the data and the information to the memory 110.

The recording medium 121 may be a memory card, a hard disk drive, or the like that is attached on the camera 100, or may be a flash memory or a hard disk drive that is built into the camera 100.

Display Control Processing 1

Figure 2A:
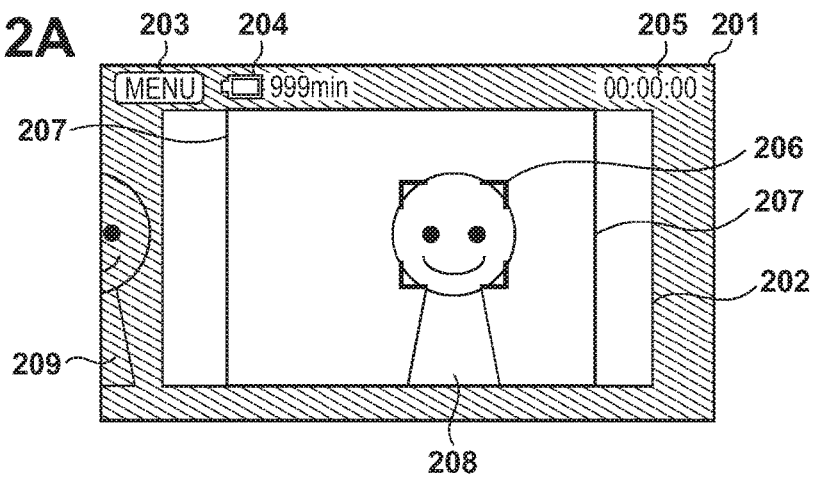
FIGS. 2A to 2C are diagrams illustrating a video image that is displayed by display control processing 1.
Figure 2B:
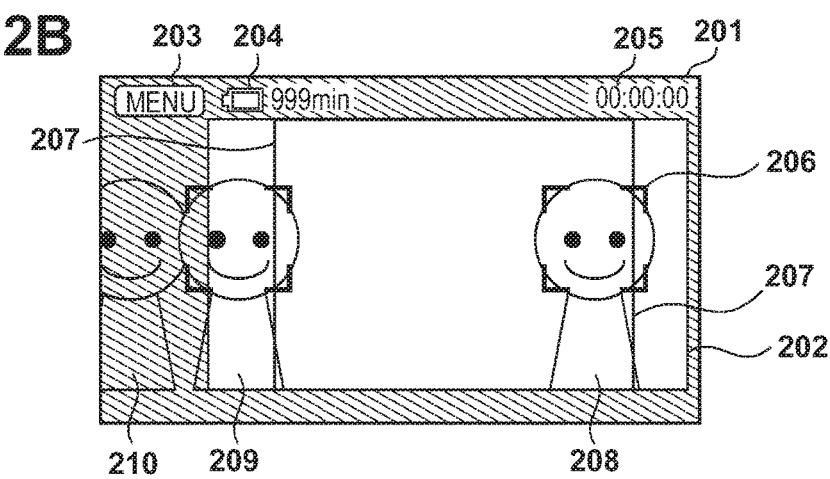
Figure 2C:
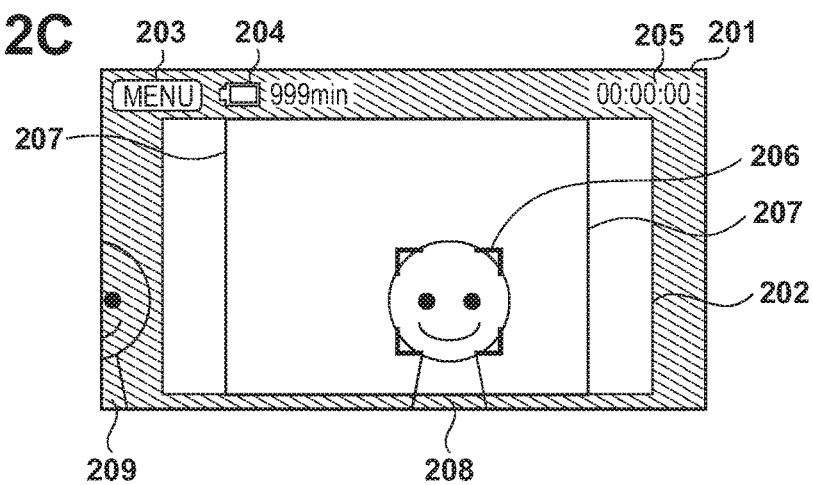

The following will describe examples of video images that are output to the display unit 107 and the second video image output terminal 106 of the camera 100 by display control processing 1 with reference to FIGS. 2A to 2C.

FIG. 2A shows an example of the displayed video image in a stationary state in which the position or the attitude of the camera 100 does not change, namely, the camera 100 is not moved, panned, or tilted.

A display range 201 denotes the entire video image that is output from the second video image output terminal 106 or the entire video image that is displayed on the display unit 107.

A frame 202 represents a range of a video image that is to be recorded (recording range) or a range of a video image that is output from the first video image output terminal 105, within the display range 201. The video image outside the frame 202 is displayed slightly darker, so that the recording range 202 and the non-recording range, which is the outside of the recording range 202, of the displayed video image can be clearly distinguished from each other. Instead of being displayed darker, the video image outside the frame 202 may be displayed brightly or in a hatched or gradated manner, so as to be distinguishable. Accordingly, the surround view display, which also displays the outside of the recording range, enables a user to view, when performing shooting, the state of the vicinity of the recording range with the display unit 107, and to use the state as a reference for framing of the camera 100.

A function button 203 is an operation unit for giving an instruction to display a menu screen. A tap operation on the function button 203 displayed on the display unit 107 is detected by the touch panel 113, and is associated with control for displaying the menu screen by the system control unit 111 performing association with a menu button.

A remaining battery amount 204 shows the remaining amount of the battery if the power supply unit 116 is the primary battery, the secondary battery, or the like, and is denoted by both an icon and a numeral value character string.

A time display 205 shows a time code that is recorded together with the video image data to the recording medium 121.

A face frame 206 shows the position of a face area, which is detected as an object, and if a plurality of faces are detected in the video image, a plurality of face frames will be displayed.

An aspect marker 207 shows, particularly, a range in a screen aspect ratio with respect to the video image to be recorded. The aspect marker 207 can be selected from among a plurality of screen aspect ratios such as "4:3", "16:9", and "2.35:1", with settings on the menu screen. Furthermore, in addition to the aspect marker, a safety marker showing the size of the central part of the screen, grid markers, which are shooting guides indicating horizontal and vertical directions, and the like can be displayed at the same time.

A first object 208 and a second object 209 are both objects that are present in the video image. The first object 208 is present in the recording range 202, and the second object 209 is present outside the recording range 202 and is partially displayed on the second video image output terminal 106 and the display unit 107.

In the case of the stationary state of FIG. 2A, the system control unit 111 controls the image capturing unit 101 and the video image processing unit 102 so that the recording range 202 is arranged at the center of the display range 201. Accordingly, a user can reliably view the video image surrounding (on the upper side, lower side, left side, and, right side of) the recording range 202 on the second video image output terminal 106 and the display unit 107.

FIG. 2B shows an example of the displayed video image in the state in which the camera 100 is panned in the left direction.

A third object 210 is a new object that is not displayed in FIG. 2A.

As shown in FIG. 2B, control is performed such that, during the movement of the camera 100, a range of the video image that is not to be recorded is displayed to be larger on a side in the direction in which the camera is moved. Accordingly, the third object 210, which is not viewable in the stationary state of FIG. 2A, can be viewed on the display unit 107 or an external monitor, and thus the user can easily determine the timing to stop panning the camera 100.

Note that, in the example of FIG. 2B, the change of the recording range 202 with respect to the entire display range 201 involves changes in the positions at which the frame 202, the face frame 206, and the aspect marker 207 are displayed. With such display control processing, the display units can play essential roles without being affected by the change in the position or attitude of the camera 100.

On the other hand, the position at which the function button 203 is displayed does not change, and thus when, for example, the user tries to operate the button at the same time as he or she is panning the camera 100, the user can perform a touch operation as usual without the position that the user is to touch shifting. Similarly, since the positions at which the remaining battery amount 204 and the time code 205 are displayed do not change either, the user can view the positions at which they are displayed without searching for them.

FIG. 2C shows an example of the displayed video image in the state in which the camera 100 is tilted upward. Although FIG. 2C differs from FIG. 2B in the direction in which the composition is changed, the same effects can be achieved.

According to the above-described display control processing, when performing shooting while changing the attitude of the camera 100 (while moving, panning, or tilting the camera 100), the user can view, with an EVF, the video image of a large non-recording range that is present in the direction in which the camera 100 is being moved. Therefore, it is easy to perform shooting while changing the position or attitude of the camera 100, namely, moving, panning, or tilting the camera 100, with respect to a desired object or obstacle. Furthermore, it is therefore possible to minimize the necessary reading operation of the image sensor or the necessary size of the VRAM while improving visibility and operability, thereby improving data transfer and power consumption. Furthermore, since it is possible to minimize the non-recording range of the display range 201 that is located in a direction opposite to the direction in which the camera 100 is being moved, the video image of the recording range 202 in the display range can be displayed on the display unit 107 or the external monitor as largely as possible.

Display Control Processing 2

The following will describe examples of video images that are output to the display unit 107 or the second video image output terminal 106 of the camera 100 by display control processing 2 with reference to FIGS. 3A and 3B.

FIG. 3A shows an example of the displayed video image in the stationary state in which the attitude of the camera 100 does not change, namely, the camera 100 is not moved, panned, or tilted. Note that in FIGS. 3A and 3B, the same reference numerals are given to the same constituent components as those of FIGS. 2A to 2C.

A rectangle 301 denotes the entire displayable area of the display unit 107 or an external monitor.

FIG. 3B shows an example of the displayed video image in the state in which the camera 100 is panned in the left direction.

As shown in FIG. 3B, in the processing of the present embodiment, control is performed so that the recording range 202 of the video image is always arranged at the center of the displayable area 301. The same applies to cases, such as moving and tilting, where the composition is changed in the direction different from that of FIG. 3B.

The present embodiment can achieve, in addition to the effects of improving the visibility and operability as well as data transfer and power consumption according to the display control processing 1, the arrangement in which the recording range 202 of the video image is always located at the center of the displayable area 301, thus making it possible to stabilize the line of sight of a user, and to reduce the likelihood of the user feeling swing back when he or she moves, pans, or tilts the camera 100.

Display Control Processing

Figure 4C:
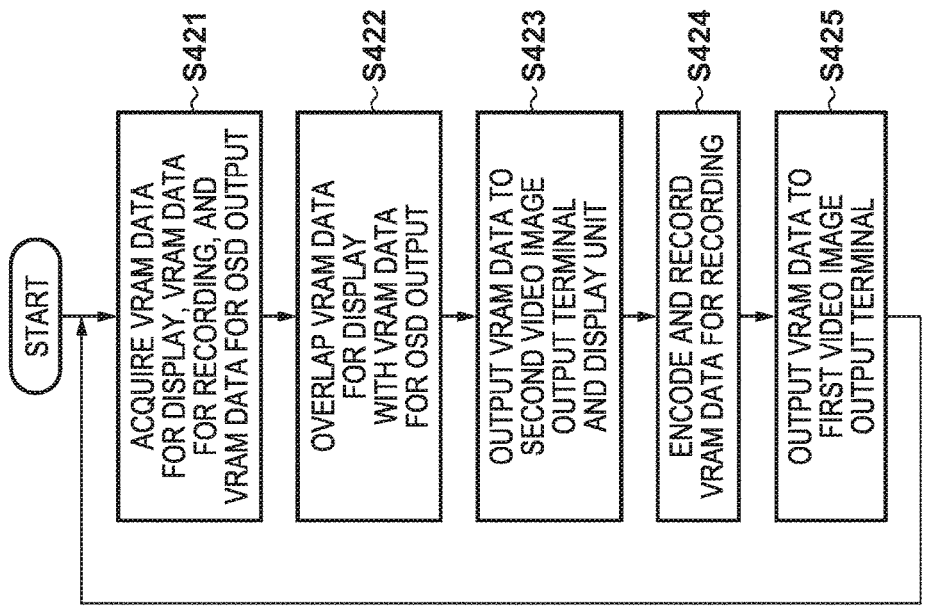
Figure 4B:
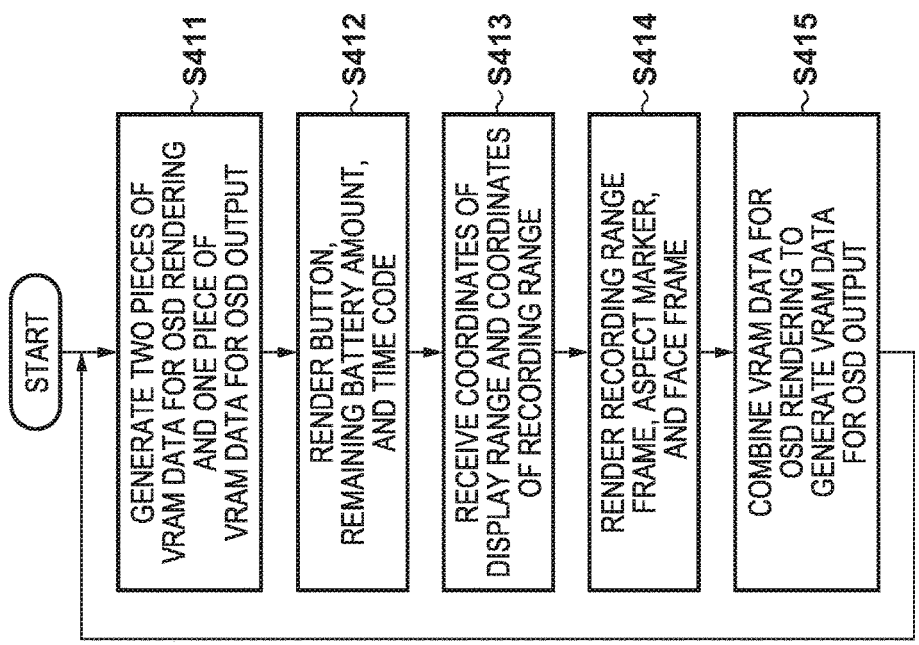

The following will describe video image display control processing that is executed by the camera 100 of the present embodiment with reference to FIGS. 4A to 4C.

Furthermore, the processes of the flowcharts according to the present invention are realized by the system control unit 111 expanding the programs stored in the nonvolatile memory 117 onto the system memory 118 and executing the expanded programs. In the system control unit 111, three tasks shown in the flowcharts of FIGS. 4A to 4C are executed in parallel by the functions of the OS included in the programs stored in the nonvolatile memory 117.

First, the task of executing image capturing processing of FIG. 4A will be described.

In step S401, the system control unit 111 sets initial positions of a display range and a recording range of video image data that is obtained from the effective pixel range of the image sensor of the image capturing unit 101. In other words, the initial positions of the display range and the recording range refer to initial target positions.

In step S402, the system control unit 111 determines, based on a result of detection by the attitude detection unit 112, whether or not the camera 100 is being moved. Specifically, it is determined whether or not acceleration of the camera 100 has been generated in the vertical direction or horizontal direction due to a user moving, panning, or tilting the camera 100 in a predetermined direction and at a predetermined speed. As a result of the determination, if it is detected that the camera 100 is being moved, the process advances to step S403, otherwise to step S404.

In step S403, the system control unit 111 determines target positions of the display range and the recording range of the video image, based on the direction or speed in which the camera 100 is moved, panned, or tilted and that is obtained based on the detection value detected by the attitude detection unit 112. Specifically, when the camera 100 is being moved, panned, or tilted, control is performed so that a area of the video image that is included in the display range but not in the recording range is larger on a side in the direction in which the attitude detected by the attitude detection unit 112 changes. When the camera 100 is not moved, panned, or tilted, control is performed so that the recording range is located at the center of the display range. For example, when the attitude detection unit 112 has detected panning in the left direction, the target position of the recording range of the video image is displaced to the right side of the display range. In a case where the speed of change in the position or attitude of the camera 100 is obtained based on the detection value detected by the attitude detection unit 112, the higher the speed of the change, the larger is the displacement between coordinates of the centers of the display range and the recording range of the video image. It is assumed that the target position remains displaced from the center as long as the camera 100 continues to be moved, panned, or tilted. That is, after the camera 100 has started moving, the coordinates of the center of the recording range of the video image are displaced from those of the display range, and are kept displaced until the camera 100 is stopped (note that the displacement degree depends on the speed at which the camera is moved, panned, or tilted). This is for a user to determine the timing to stop moving, panning, or tilting the camera by viewing the area of the video image that is included in the display range but not in the recording range and that is set to be larger on a side in the direction in which the attitude changes. In response to the change from the state in which the camera 100 is being moved, panned, or tilted to the stationary state, the recording range is gradually moved toward the center of the display range so that the displacement between the coordinates of the centers of the display range and the recording range is solved. Note that the degree of the displacement is not necessarily varied depending on the speed at which the camera is moved, panned, or tilted, and may be set to a predetermined amount.

In step S404, the system control unit 111 determines whether or not the current display range and recording range of the video image correspond to the target positions, and if it is determined that the ranges correspond to the target positions, the process advances to step S405, and otherwise, the process returns to step S402.

In step S405, the system control unit 111 determines the current positions of the display range and the recording range of the video image. The display range and the recording range of the video image are gradually displaced toward the target positions determined in step S403 over a predetermined time period. By performing control in this manner, the video image that is displayed on the display unit 107 and the external monitor can smoothly transition so that a user does not have unnatural feelings between FIGS. 2A and 2B. There are cases where the control of the image capturing unit 101 is changed together with this processing in order to obtain a video image having a desired display range and a desired recording range, but details thereof will be described later.

In step S406, the system control unit 111 inputs the video image data obtained by the image capturing unit 101 to the video image processing unit 102.

In step S407, the system control unit 111 performs processing for appropriately correcting the distortion aberration of the video image, using the video image processing unit 102. Specifically, when shooting is performed with a wide-angle lens, larger distortion aberration occurs toward the peripheral part of the video image. Specifically, if the optical axis is shifted from the center of the video image to be recorded, the video image to be recorded has distortions of different magnifications between the left and the right parts thereof or between the upper and the lower parts thereof, and a user is more likely to perceive the distortions. Accordingly, in the processing of the present invention, distortion aberration correction is performed according to the shift of the optical axis. Although the distortion aberration correction method is disclosed in, for example, U.S. Pat. No. 4,781,229, the present invention is not limited to this and can be realized by any method.

In step S408, the system control unit 111 generates, using the video image processing unit 102, VRAM data for display and VRAM data for recording, in the memory 110. The VRAM data for display encompasses the video image area of the VRAM data for recording.

In step S409, the system control unit 111 transmits, to the tasks of FIGS. 4B and 4C, both the coordinates of the display range and the coordinates of the recording range with the center of the optical axis set as an origin.

The following will describe the task of performing display processing of FIG. 4B.

In step S411, the system control unit 111 generates, in the memory 110, two pieces of VRAM data for OSD rendering and at least one piece of VRAM data for OSD output.

In step S412, the system control unit 111 renders the function button 203, the remaining battery amount 204, and the time code 205 on one of the two pieces of VRAM data for OSD rendering that are generated in step S411. Although not shown in the flowchart of the present invention, in these processes, rendering is performed as needed upon receiving state update requests from a task of managing the touch panel 113, a task of controlling the power control unit 115, and a task of controlling the codec 103.

In step S413, the system control unit 111 receives the coordinates of the display range and the coordinates of the recording range transmitted in step S409.

In step S414, based on the coordinates of the display range obtained in step S413, the system control unit 111 render the frame 202, the aspect marker 207, and the face frame 206 on the other one of the VRAM data pieces for OSD rendering generated in the memory 110, using the GPU 108. The outside of the frame 202 is filled in with a translucent black color so that the video image appears dark when being overlapped with the outside of the frame 202. Accordingly, the recording range and the non-recording range in the display range of the video image can be distinguished from each other more clearly. Furthermore, the aspect marker 207 is rendered so as to be aligned with the recording range of the video image.

In step S415, the system control unit 111 combines, using the GPU 108, the two pieces of VRAM data for OSD rendering that are rendered in steps S412 and S414 so as to generate VRAM data for OSD output.

The following will describe the task of performing recording processing and video image output processing of FIG. 4C.

In step S421, the system control unit 111 acquires the VRAM data for display and the VRAM data for recording that are generated in step S408, and the VRAM data for OSD output obtained by the combination in step S415.

In step S422, the system control unit 111 overlaps the VRAM data for display and the VRAM data for OSD output that are acquired in step S421 with each other, using the video image output unit 104.

In step S423, the system control unit 111 outputs the VRAM data that is obtained by the overlapping in step S422 to the display unit 107 or the second video image output terminal 106.

In step S424, the system control unit 111 encodes the VRAM data for recording using the codec 103.

In step S425, the system control unit 111 outputs the VRAM data for recording to the first video image output terminal 105 using the video image output unit 104.

The following will describe processing for determining the current positions in step S405 with reference to FIGS. 5A to 5G.

FIGS. 5A to 5G each shows the entire video image obtained from the effective pixel range of the image sensor, and the display range and the recording range.

Figure 5A:
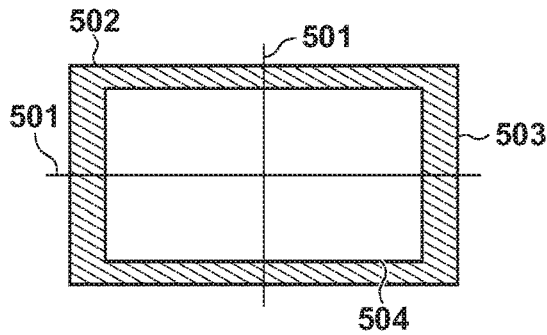
FIGS. 5A to 5G are diagrams illustrating a relationship between an entire captured video image and a display range of the video image.
Figure 5D:
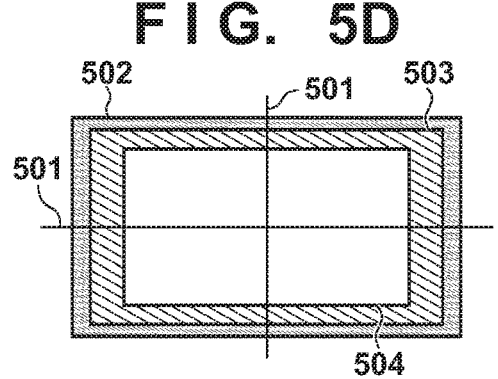
Figure 5B:
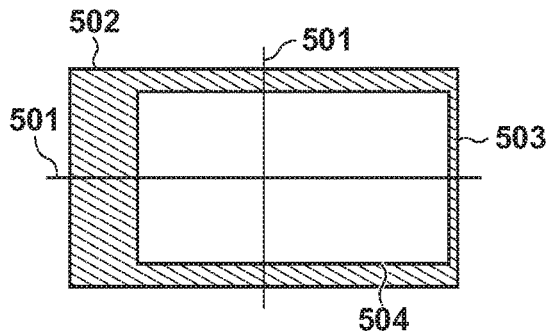
Figure 5E:
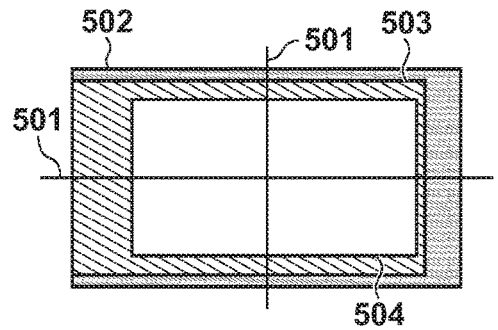
Figure 5C:
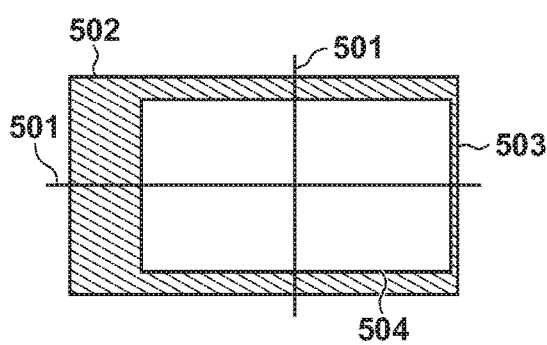

FIGS. 5A to 5C show the case where all effective pixels of the image sensor are assigned to the display range as a first pattern.

FIG. 5A shows the stationary state of FIG. 2A or 3A.

The reference numeral 501 denotes an indication showing the center of an image circle, and is actually not present.

The reference numeral 502 denotes a rectangle (hereinafter, referred to as "sensor rectangle") indicating the entire effective pixel range of the image sensor.

The reference numeral 503 denotes a rectangle (hereinafter, referred to as "display rectangle") indicating a pixel range obtained by extracting a displayed video image. In FIG. 5A, the sensor rectangle 502 and the display rectangle 503 are identical.

The reference numeral 504 denotes a rectangle (hereinafter, referred to as "recording rectangle") indicating a recording range of the video image, or the range of the video image that is output from the first video image output terminal 105.

FIG. 5B corresponds to the display state of FIG. 2B or 3B.

The recording rectangle 504 is displaced to the right side relative to that in FIG. 5A, and a area of the video image that is not to be recorded but is displayed is secured to be large on the left side in the panning direction. Since the recording rectangle 504 is largely shifted with respect to the center of the image circle, distortion correction is suitably performed by the video image processing unit 102.

This first pattern can achieve the effects of the present embodiment while securing the pixel range of the image sensor that corresponds to the recording range as large as possible, and thus is advantageous in terms of sensitivity or blurring amount of the video image to be recorded as compared with other patterns, which will be described later.

Similar to FIG. 5B, FIG. 5C corresponds to the display state of FIG. 2B or 3B.

The center of the image circle is displaced, together with the recording rectangle 504, to the right side with respect to the sensor rectangle 502. In this case, the recording rectangle 504 moves equally with respect to the panning of the camera 100, and thus the user is unlikely to have unnatural feelings such as the swing back. Furthermore, it is sufficient to only perform ordinary distortion correction by the video image processing unit 102, and thus distortion is unlikely to occur in the video image to be recorded.

In order to realize this configuration, it is necessary to shift the image circle using the shake correction lens included in the image capturing unit 101, or physically shift the image sensor so as to displace the image sensor from the center of the image circle.

FIGS. 5D and 5E show a second pattern in which the range slightly smaller than the entire effective pixel range of the image sensor is assigned to the display range. Since the outside of the display range is used as an excess pixel area for extracting the video image with electronic anti-vibration, the display range is shifted in the vertical direction and horizontal direction based on the shake amount of the camera 100.

FIG. 5D corresponds to the display state of FIG. 2A or 3A.

The display rectangle 503 is slightly smaller than the sensor rectangle 502, and the recording rectangle 504 is even smaller than the display rectangle 503.

FIG. 5E corresponds to the display state of FIG. 2B or 3B.

The display rectangle 503 is displaced to the left side relative to that in FIG. 5D, the recording rectangle 504 is displaced to the right side relative to that in FIG. 5D, and thus an area of the video image that is not to be recorded but is displayed is secured to be large on the left side in the panning direction.

In this second pattern, when the camera 100 is not moved, panned, or tilted, the camera shake correction effects can be achieved by electronic anti-vibration. Furthermore, when the camera 100 is being moved, panned, or tilted, the relative position between the display rectangle 503 and the recording rectangle 504 is changed also using the pixel area for electronic anti-vibration. With this, the position of the recording rectangle 504 with respect to the sensor rectangle 502 is not shifted as much as in FIG. 5B, and thus there is an advantage that a user is relatively unlikely to have unnatural feelings such as the swing back. Furthermore, there is no need to perform extensive distortion correction using the video image processing unit 102, and distortion is unlikely to occur in the video image to be recorded.

Figure 5F:
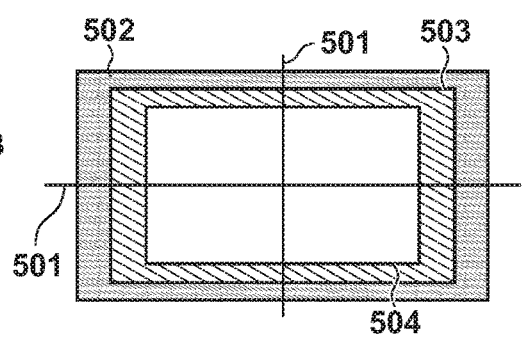
Figure 5G:
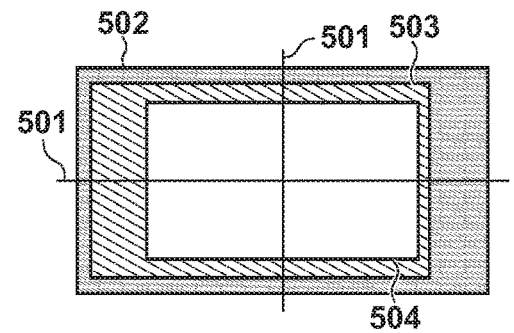

FIGS. 5F and 5G show a third pattern in which a rather a small range than those of FIGS. 5D and 5E is assigned to the display range. The outside of the display range is used as the excess pixel area for electronic anti-vibration, and thus the display range is shifted in the vertical direction and horizontal direction based on the shake amount of the camera 100.

FIG. 5F corresponds to the display state of FIG. 2A or 3A.

The display rectangle 503 is much smaller than the sensor rectangle 502, and the recording rectangle 504 is even smaller than the display rectangle 503.

FIG. 5G corresponds to the display state of FIG. 2B or 3B.

The display rectangle 503 is displaced to the left side relative to that in FIG. 5F, but the recording rectangle 504 remains at the same position as that in FIG. 5F. Accordingly, an area of the video image that is not to be recorded but is displayed is secured to be large on the left side in the panning direction.

In this third pattern, regardless of whether or not the camera 100 is moved, panned, or tilted, the camera shake correction effects can be achieved using electronic anti-vibration. Furthermore, since the position of the recording rectangle 504 is fixed, the recording rectangle 504 moves equally with respect to the panning of the camera 100. Accordingly, the user is unlikely to have unnatural feelings such as the swing back. Furthermore, it is sufficient only to perform ordinary distortion correction with the video image processing unit 102, and thus distortion is unlikely to occur in a video image to be recorded.

Note that the control of the system control unit 111 may be performed by one piece of hardware, or a plurality of pieces of hardware share the processing to perform overall control of the apparatus.

Furthermore, although the present invention has been described in detail with reference to the suitable embodiments so far, the present invention is not limited to the specific embodiments and various modifications are included in the present invention without departing from the spirit of the present invention. Furthermore, the foregoing embodiments merely show an example of the present invention, and may suitably be combined with each other.

Moreover, in the foregoing embodiments, an example in which the present invention is applied to an image capturing apparatus such as a digital camera has been described, but the present invention is not limited to the example and is applicable to any apparatus as long as it has the function of extracting (cropping) a part of a captured video image and recording the resultant video image. In other words, the present invention is applicable to a personal computer or a tablet, which is a type thereof, a mobile phone or a smartphone, which is a type thereof, a PDA, a mobile image viewer, a music player, a game console, digital book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-167006, filed Aug. 26, 2015 which is hereby incorporated by reference herein in its entirety.

What is claimed is:

1. An image capturing apparatus comprising:
an image capturing unit configured to capture an object;
a display unit configured to display a video image captured by the capturing unit;
an extracting unit configured to extract an area of the video image that is within a display range displayed by the display unit and is smaller than the display range;
a detecting unit configured to detect a change in a position or attitude of the apparatus; and
a display control unit configured to perform control so that an area of the video image that is within the display range displayed by the display unit and is not extracted by the extracting unit is larger on a side in a direction in which the position or attitude of the apparatus changes.

2. The apparatus according to claim 1, further comprising a recording unit configured to record the area of the video image that is extracted by the extracting unit.

3. The apparatus according to claim 1, further comprising an output unit configured to output the area of the video image that is extracted by the extracting unit.

4. The apparatus according to claim 1,
wherein the detecting unit detects a direction and a speed in and at which the apparatus is moved, panned, or tilted, and
the display control unit controls a size of the area of the video image that is displayed by the display unit but is not extracted, based on the direction and the speed in and at which the apparatus is moved, panned, or tilted.

5. The apparatus according to claim 1,
wherein the display control unit performs control so as to change a position of the display range in the video image captured by the image capturing unit.

6. The apparatus according to claim 1,
wherein the display control unit performs control so as to change a position of the area of the video image that is extracted by the extracting unit from the video image captured by the image capturing unit.

7. The apparatus according to claim 5,
wherein the display control unit performs control so as to change the position gradually over a predetermined time.

8. The apparatus according to claim 5,
wherein the display control unit performs control so as to change the position of the display range and to not change a position of an operation unit that is displayed in the display range.

9. The apparatus according to claim 6, further comprising a correcting unit configured to correct distortion aberration of the area of the video image that is extracted by the extracting unit, the distortion aberration occurring due to the control of the display control unit.

10. The apparatus according to claim 5,
wherein the display control unit performs control so as to change a physical position of an image sensor included in the image capturing unit.

11. The apparatus according to claim 10,
wherein the display control unit performs control so as to change an area of the video image captured by the image sensor by shifting a part of an optical lens included in the image capturing unit.

12. The apparatus according to claim 1,
wherein the display unit includes an excess displayable area outside the display range of the video image, and
the display control unit changes a relative position of the excess displayable area with respect to a recording range on the display unit, and performs control so that the excess displayable area is larger on a side in a direction opposite to the direction in which the apparatus is moved.

13. The apparatus according to claim 11, further comprising an anti-vibration unit configured to correct a shake of the apparatus due to a hand shake, wherein the anti-vibration unit performs anti-vibration control using the excess displayable area.

14. A control method of an image capturing apparatus comprising:

capturing an object image;

displaying a captured video image;

extracting an area of the video image that is within a display range for the displaying and is smaller than the display range;

detecting a change in a position or attitude of the apparatus; and performing control so that an area of the video image that is within the display range and is not extracted is larger on a side in a direction in which the position or attitude of the apparatus changes.

15. A non-transitory computer-readable storage medium storing a program for causing a computer to execute the a control method of an image capturing apparatus comprising:

capturing an object image;

displaying a captured video image;

extracting an area of the video image that is within a display range for the displaying and is smaller than the display range;

detecting a change in a position or attitude of the apparatus; and performing control so that an area of the video image that is within the display range and is not extracted is larger on a side in a direction in which the position or attitude of the apparatus changes.

* * * * *